(12) United States Patent
Flory et al.

(10) Patent No.: US 8,794,280 B2
(45) Date of Patent: Aug. 5, 2014

(54) VEHICLE TIRE INFLATION SYSTEM AND A METHOD OF CONTROL

(75) Inventors: Ken Flory, Commerce Township, MI (US); Jeff Lloyd, Naperville, IL (US); Cesar Nunes, Greenville, SC (US)

(73) Assignee: ArvinMeritor Technology, LLC, Troy, MI (US)

( * ) Notice: Subject to any disclaimer, the term of this patent is extended or adjusted under 35 U.S.C. 154(b) by 435 days.

(21) Appl. No.: 13/238,292

(22) Filed: Sep. 21, 2011

(65) Prior Publication Data

US 2013/0068361 A1    Mar. 21, 2013

(51) Int. Cl.
*B60C 23/10*       (2006.01)

(52) U.S. Cl.
USPC ............................ 152/415; 137/14

(58) Field of Classification Search
CPC .... B60C 23/00; B60C 23/001; B60C 23/003; B60C 23/10
USPC .................. 152/415, 416, 417, 418
See application file for complete search history.

(56) References Cited

U.S. PATENT DOCUMENTS

| | | | | |
|---|---|---|---|---|
| 2,849,047 A * | 8/1958 | Lamont et al. | ................ | 152/417 |
| 3,276,503 A * | 10/1966 | Kilmarx | ........................ | 152/417 |
| 6,155,313 A * | 12/2000 | Smalley | ......................... | 141/38 |
| 6,374,869 B2 * | 4/2002 | Makino et al. | .................. | 141/38 |
| 6,425,427 B1 * | 7/2002 | Stech | ............................. | 152/417 |
| 6,612,346 B1 * | 9/2003 | Allen et al. | ..................... | 141/38 |
| 7,437,920 B2 * | 10/2008 | Beverly et al. | ............... | 73/146.2 |
| 7,530,379 B1 * | 5/2009 | Becker et al. | ................. | 152/415 |
| 8,245,746 B2 * | 8/2012 | Stanczak | ...................... | 152/415 |
| 2007/0125232 A1 * | 6/2007 | Wrosch et al. | ...................... | 96/4 |
| 2010/0078109 A1 * | 4/2010 | Wilson et al. | ................. | 152/416 |

* cited by examiner

*Primary Examiner* — S. Joseph Morano
*Assistant Examiner* — Jean Charleston
(74) *Attorney, Agent, or Firm* — Brooks Kushman P.C.

(57) ABSTRACT

A tire inflation system and a method of control. The tire inflation system includes the first gas supply and a second gas supply. The first gas supply is configured to provide a first compressed gas mixture. The second gas supply is configured to provide a second compressed gas mixture having a greater concentration of nitrogen than the first compressed gas mixture. The first or second compressed gas mixtures may be provided to inflate a vehicle tire.

20 Claims, 2 Drawing Sheets

VEHICLE TIRE INFLATION SYSTEM AND A METHOD OF CONTROL

TECHNICAL FIELD

The present application relates to a vehicle tire inflation system and a method of control.

BACKGROUND

A nitrogen generation system is disclosed in U.S. patent publication number 2007/0125232.

SUMMARY

In at least one embodiment a tire inflation system for a vehicle is provided. The tire inflation system includes a first gas supply, a second gas supply, a switching valve, and a tire maintenance system. The first gas supply is configured to provide a first compressed gas mixture. The second gas supply is configured to provide a second compressed gas mixture having a greater concentration of nitrogen than the first compressed gas mixture. The switching valve is fluidly coupled to the first and second gas supplies. The tire maintenance system is disposed on the vehicle and fluidly couples the switching valve to a vehicle tire. The switching valve provides the second compressed gas mixture to the tire maintenance system to inflate the vehicle tire when a pressure of the second compressed gas mixture is greater than a second gas mixture threshold pressure value.

In at least one embodiment a tire inflation system for a vehicle is provided. The tire inflation system includes a pressurized gas supply system that is disposed on the vehicle. The pressurized gas supply system includes a first compressed gas supply, a nitrogen generation module, and a switching valve. The first compressed gas supply provides compressed air. The nitrogen generation module receives compressed air from the first compressed gas supply and outputs a second compressed gas mixture having a greater concentration of nitrogen than that of the compressed air. The switching valve has a first input that receives compressed air from the first compressed gas supply and a second input that receives the second compressed gas mixture. The switching valve outputs compressed air when in a first position and outputs the second compressed gas mixture when in a second position.

In at least one embodiment a method of controlling a tire inflation system is provided. A pressurized gas supply system is provided that has a first gas supply and a second gas supply. The first gas supply is configured to provide a first compressed gas mixture. The second gas supply is configured to provide a second compressed gas mixture having a greater concentration of nitrogen than the first gas mixture. The method determines whether inflation of a tire is desired. The second compressed gas mixture is provided to inflate the tire when inflation of the tire is desired and a pressure of the second compressed gas mixture exceeds a second gas mixture threshold pressure value. The first compressed gas mixture is provided to inflate the tire when inflation of the tire is desired, pressure of the second compressed gas mixture does not exceed the second gas mixture threshold pressure value, and a pressure of the first compressed gas mixture exceeds a first gas mixture threshold pressure value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
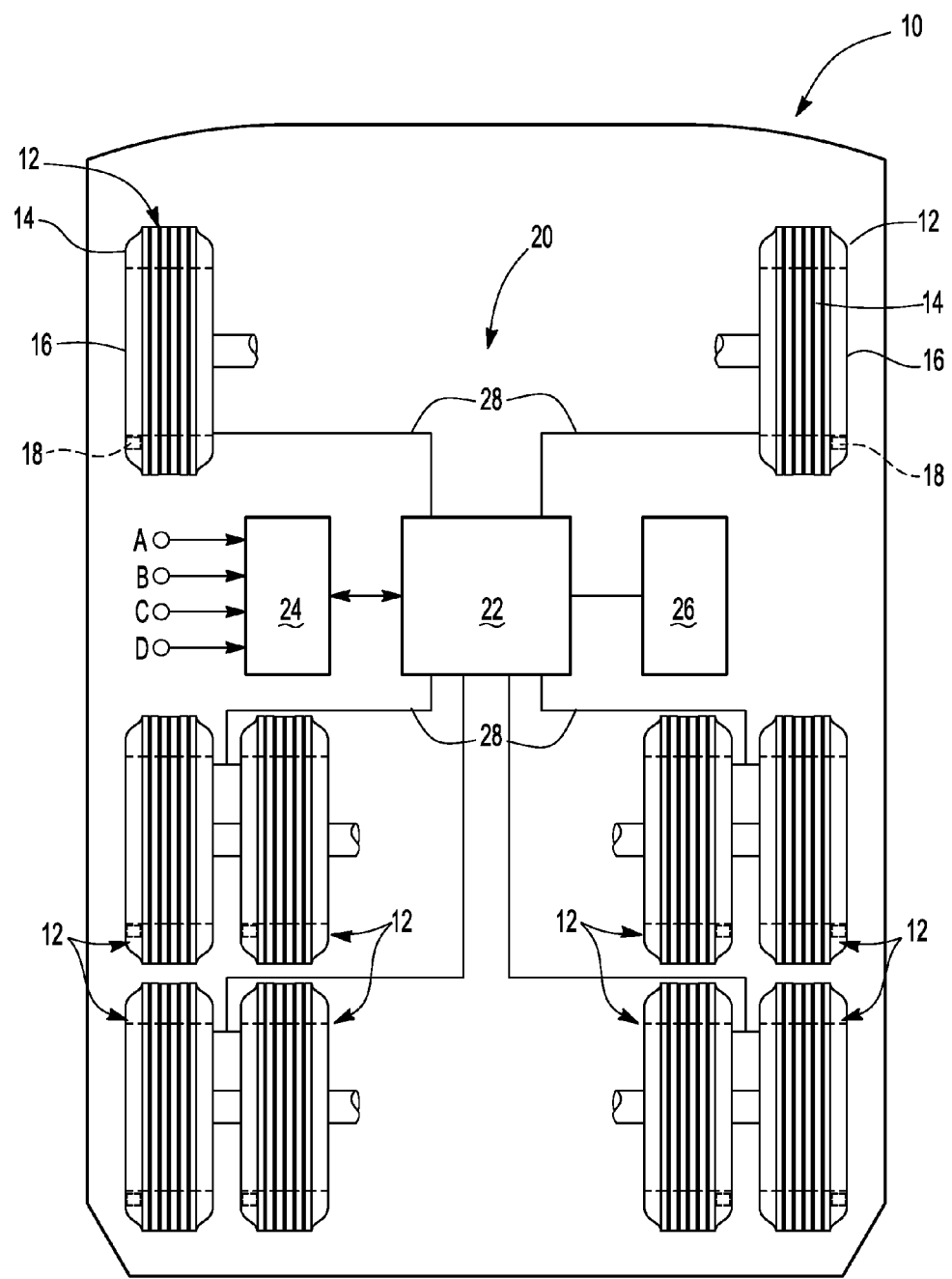
FIG. 1 is a schematic of an exemplary vehicle having a tire inflation system.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels.

The vehicle 10 may include a plurality of wheel assemblies 12. Each wheel assembly 12 may include an inflatable tire 14 that may be mounted on an associated wheel 16. A tire pressure sensor 18 may be mounted on each wheel assembly 12 and may be configured to detect and communicate the inflation pressure of an associated tire 14.

The vehicle 10 may also include a tire inflation system 20 that may monitor tire pressure and control inflation of one or more tires 14. The tire inflation system 20 may be disposed on the vehicle 10 and may include a tire maintenance system 22, a control system 24, and a pressurized gas supply system 26.

The tire maintenance system 22 may receive a compressed or pressurized gas mixture from the pressurized gas supply system 26 and may provide the pressurized gas mixture to a tire 14 when under inflation of the tire 14 is detected. The tire maintenance system 22 may include one or more conduits 28, such as a hose, tubing, pipe, or combinations thereof, which may provide pressurized gas to a tire 14. A valve may be associated with or provided with a conduit 28 to enable or disable the flow of the pressurized gas mixture from the pressurized gas supply system 26 to one or more tires 14.

The control system 24 may monitor and control operation of the tire inflation system 20. The control system 24 may include at least one controller or control module that monitors and/or controls various components of the tire maintenance system 22 and the pressurized gas supply system 26. For example, the control system 24 may be configured to receive data from each tire pressure sensor 18 indicative of the inflation pressure of a corresponding tire 14. Such data may be transmitted wirelessly in one or more embodiments. The control system 24 may also be configured to control the flow of a pressurized gas mixture from the pressurized gas supply system 26 to the tire maintenance system 22 and to a tire 14. For instance, the control system 24 may open a valve to permit a pressurized gas mixture to flow to one or more tires 14 and close a valve to inhibit the flow of the pressurized gas mixture to a tire 14 via the tire maintenance system 22.

Figure 2:
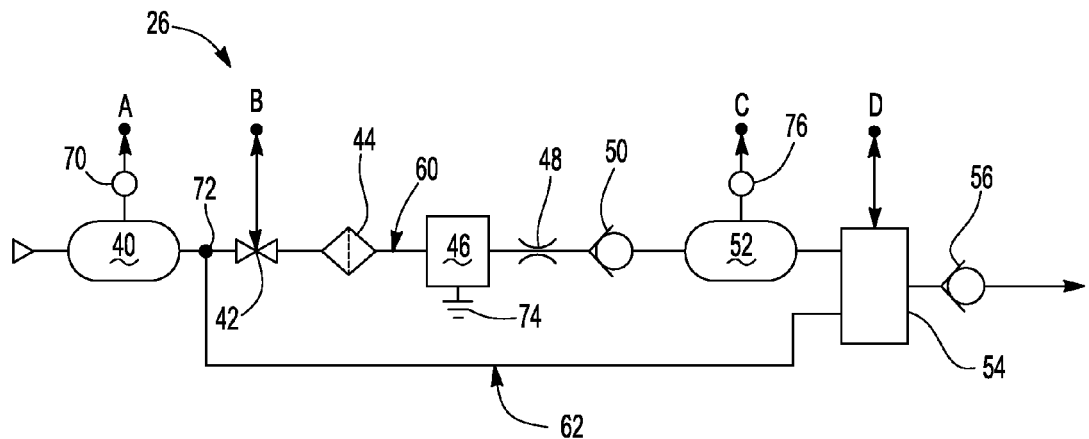
FIG. 2 is a schematic of an exemplary pressurized gas supply system that may be provided with the tire inflation system.

Referring to FIGS. 1 and 2, an exemplary pressurized gas supply system 26 is shown. The pressurized gas supply system 26 may be disposed on the vehicle 10 and may be configured to provide different compressed or pressurized gas mixtures to the tire maintenance system 22. For example, the pressurized gas supply system 26 may provide a first compressed gas mixture or a second compressed gas mixture. The first and second compressed gas mixtures may be compressed or pressurized to a substantially higher pressure than atmospheric pressure. For example, the first and second compressed gas mixtures may be provided at a greater pressure than a desired inflation pressure of a tire 14. In at least one embodiment, the first compressed gas mixture may be air that may be dried to remove water vapor and may be substantially free of lubricants. (Dried air may have approximately 78.08% nitrogen and 20.95% oxygen by volume with the remainder being other gases.) The second pressurized gas mixture may have a substantially greater concentration of nitrogen than the first compressed gas mixture. For instance, the second pressurized gas mixture may be purified such that the second pressurized gas mixture contains at least 95% nitrogen by volume.

In at least one exemplary embodiment, the pressurized gas supply system 26 may include a first gas supply 40, a first valve 42, a filter 44, a nitrogen generation module 46, a flow restrictor 48, a first check valve 50, a second gas supply 52, a switching valve 54, and a second check valve 56. Each of these components may be fluidly connected to at least one other component via a conduit, such as a hose, tubing, pipe, or combinations thereof. In FIG. 2 the conduits may generally be referred to as a first branch 60 and a second branch 62.

The first gas supply 40 may be configured to supply or store a volume of the first compressed gas mixture. For example, the first gas supply 40 may be a tank or air compressor that may be disposed on the vehicle 10. In at least one embodiment, an air compressor may be driven by a vehicle engine or electrical power source and may provide pressurized air to the first gas supply 40. A first pressure sensor 70 may be provided to detect the pressure of the first compressed gas mixture. The first pressure sensor 70 may be fluidly coupled to the first gas supply 40 or a conduit that is fluidly connected to the first gas supply 40. The first pressure sensor 70 may provide data to the control system 24 as represented by connection node A.

The first valve 42 may enable or disable the flow of the first compressed gas mixture from an outlet of the first gas supply 40 to the first branch 60. The first valve 42 may be disposed between the filter 44 and a fitting 72 at which the second branch 62 splits from the first branch 60. Operation of the first valve 42 may be controlled by the control system 24 as represented by connection node B. For instance, the first valve 42 may include or may be controlled by an actuator, such as solenoid, that may actuate the first valve 42 between an open position and a closed position. In the open position, the first compressed gas mixture may flow from the first gas supply 40 to the first branch 60. In the closed position, the first compressed gas mixture may be inhibited from flowing from the first gas supply 40 to the first and second branches 60, 62. In at least one embodiment, the first valve 42 may be normally closed under predetermined operating conditions, such as when the vehicle 10 is not operational or turned off or when the vehicle engine is not running. As such, the first valve 42 may inhibit depressurization of the first gas supply 40 in the event of a downstream leak. In addition, the first valve 42 may be opened to facilitate filling of the second gas supply 52 as will be discussed in more detail below.

The filter 44 may be provided to remove particulates from the first compressed gas mixture that may otherwise degrade performance of the nitrogen generation module 46. The filter 44 may be disposed along the first branch 60 between the first valve 42 and the nitrogen generation module 46.

The nitrogen generation module 46 may receive the first compressed gas mixture from the filter 44 and separate nitrogen from other gases or fluids to increase nitrogen purity. The nitrogen-rich gas or second compressed gas mixture may be output along the first branch 60 toward the second gas supply 52 while other gases, such as oxygen, argon, and carbon dioxide, may be exhausted to the atmosphere via an exhaust port 74. The nitrogen generation module 46 may be of any suitable type. For instance, the nitrogen generation module 46 may include a gas separation membrane that may include a plurality of hollow fibers that separate nitrogen from other gases, such as is found in models made by Parker Hannifin Corporation.

The flow restrictor 48 may be disposed between the nitrogen generation module 46 and the second gas supply 52 to control the gas flow rate along the first branch 60 to improve the operating efficiency of the nitrogen generation module 46. The flow restrictor 48 may be fixed or variable.

The first check valve 50 may be disposed between the flow restrictor 48 and the second gas supply 52. The first check valve 50 may permit the second compressed gas mixture to flow from the nitrogen generation module 46 to the second gas supply 52 while inhibiting flow in the opposite direction. The first check valve 50 may facilitate operation of the nitrogen generation module 46 by inhibiting backflow and may inhibit unintended depressurization of the second gas supply 52.

The second gas supply 52 may be configured to supply or store a volume of the second compressed gas mixture. For example the second gas supply 52 may be a tank that may be disposed on the vehicle 10. A second pressure sensor 76 may be provided to detect the pressure of the second compressed gas mixture. The second pressure sensor 76 may be fluidly coupled to the second gas supply 52 or a conduit that is fluidly connected to the second gas supply 52. The second pressure sensor 76 may provide data to the control system 24 as represented by connection node C. Data from the second pressure sensor 76 may be the basis for controlling other components. For instance, the first valve 42 may be opened to facilitate the generation of the second compressed gas mixture when a pressure detected by the second pressure sensor 76 is below a predetermined value and the vehicle is operational to replenish or fill the second gas supply 52. Moreover, the first valve 42 may be opened when the second compressed gas mixture is being used to inflate a tire 14.

The switching valve 54 may selectively permit or inhibit the flow of a gas mixture from the pressurized gas supply system 26 to the tire maintenance system 22. The switching valve 54 may have first and second inputs that are fluidly coupled to the first and second branches 60, 62, respectively. The switching valve 54 may have at least two positions, such as a first position and a second position. The switching valve 54 may be configured to be controlled by the control system 24 as represented by connection node D. For instance, the switching valve 54 may be controlled by an actuator, such as solenoid, that may actuate the switching valve 54 between the first, second, and third positions. In the first position, the second gas mixture is permitted to flow from the second gas supply 52 along the first branch 60 through the switching valve 54 while the flow of the first gas mixture from the first gas supply 40 along the second branch 62 is inhibited. In the second position, the first gas mixture is permitted to flow from the first gas supply 40 along the second branch 62 through the switching valve 54 while the flow of the second gas mixture from the second gas supply 52 is inhibited.

The second check valve 56 may be disposed downstream of the switching valve 54. The second check valve 56 may permit a gas mixture to flow from the switching valve 54 to the tire maintenance system 22 inhibiting flow in the opposite direction, thereby inhibiting unintended depressurization or backflow from the tire maintenance system 22 to the pressurized gas supply system 26.

Figure 3:
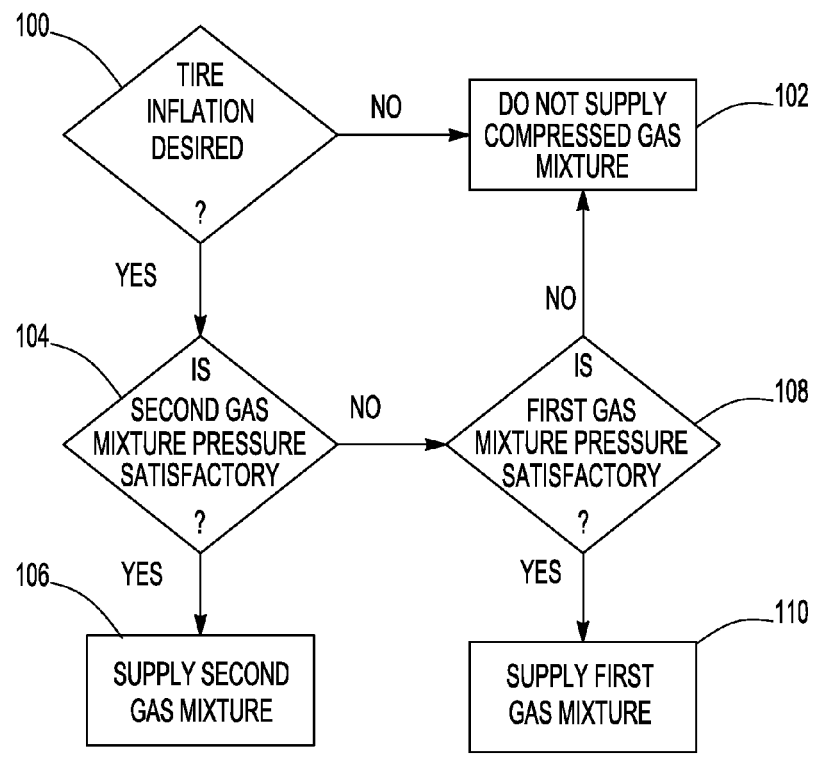
FIG. 3 is a flowchart of an exemplary method of control of the tire inflation system.

Referring to FIG. 3, a flowchart of an exemplary method of control of the tire inflation system 20 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the spirit or scope intended.

In at least one embodiment, the method may be executed by the control system 24 and may be implemented as a closed loop control system. Moreover, the method may be enabled or disabled based the operating state of the vehicle 10. For example, the method or control logic may be enabled when the vehicle ignition is turned on, the engine is running, or the vehicle is in motion in one or more embodiments.

At 100, the method determines whether tire inflation is desired. Tire inflation may be desired when the pressure detected by a tire pressure sensor 18 indicates that the pressure of a tire 14 is below a predetermined tire pressure value (i.e., a low tire pressure). If the tire pressure is not below the predetermined tire pressure value, then a pressurized or compressed gas mixture is not provided to inflate a tire 14 at block 102. A pressurized gas mixture may not be provided by positioning the switching valve 54 in the third position to inhibit the flow of the first and second pressurized gas mixtures from the pressurized gas supply system 26. If the tire pressure is below the predetermined tire pressure value, then the method continues at block 104.

At block 104, the method determines whether the pressure of the second compressed gas mixture is satisfactory. The pressure of the second compressed gas mixture may be satisfactory when the pressure detected by the second pressure sensor 76 is greater than or equal to a second gas mixture threshold pressure value. The second gas mixture threshold value may be predetermined and may be greater than a desired tire inflation pressure. If the detected pressure is greater than or equal to the second gas mixture threshold pressure value, then the method continues at block 106. If the pressure is not greater than the second gas mixture threshold pressure value, then the method continues at block 108.

At block 106, the second compressed gas mixture is provided to inflate one or more tires 14. The second compressed gas mixture may be provided by positioning the switching valve 54 in the first position. Moreover, the first valve 42 may be opened to help maintain pressure or replenish a volume of the second compressed gas mixture that may be used to inflate a tire. In addition, the control system 24 may open one or more valves to route the second compressed gas mixture along a predetermined conduit to one or more tires 14 designated for inflation.

At block 108, the method determines whether the pressure of the first compressed gas mixture is satisfactory. The pressure of the first compressed gas mixture may be satisfactory when the pressure detected by the first pressure sensor 70 is greater than or equal to a first gas mixture threshold pressure value. The first gas mixture threshold value may be predetermined and may be greater than a desired tire inflation pressure. If the detected pressure is not greater than or equal to the first gas mixture threshold pressure value, then the method continues at block 102 where no compressed gas mixture is provided to the tire maintenance system 22 to inflate a tire 14. If the pressure is greater than the first gas mixture threshold pressure value, then the method continues at block 110.

At block 110, the first compressed gas mixture is provided to inflate one or more tires. The first compressed gas mixture may be provided by positioning the switching valve 54 in the second position. In addition, the control system 24 may open one or more valves to route the first compressed gas mixture along a predetermined conduit to one or more tires 14 designated for inflation.

In one or more embodiments, the system and method described above may facilitate filling a vehicle tire with nitrogen, which may increase fuel economy, increase tire life by reducing oxidation, slow gas leakage from the tire, and reduce tire-related maintenance costs. Moreover, the system and method may allow mobile nitrogen tire filling without specialized service stations or stationary nitrogen tire pumps and the associated capital investment. In addition, the system and method provide a backup tire filling option with air in the event of a leak or insufficient nitrogen gas supply, which may allow a vehicle to continue to operate with a desired tire pressure, which may help avoid a decreased fuel economy or tire failure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system for a vehicle comprising:
a first gas supply configured to provide a first compressed gas mixture;
a second gas supply configured to provide a second compressed gas mixture having a greater concentration of nitrogen than the first compressed gas mixture; and
a switching valve fluidly coupled to the first and second gas supplies; and
a tire maintenance system disposed on the vehicle that fluidly couples the switching valve to a vehicle tire;
wherein the switching valve provides the second compressed gas mixture to the tire maintenance system to inflate the vehicle tire when a pressure of the second compressed gas mixture is greater than a second gas mixture threshold pressure value and provides the first compressed gas mixture to the tire maintenance system to inflate the vehicle tire when the pressure of the second compressed gas mixture is not greater than the second gas mixture threshold pressure value.

2. The tire inflation system of claim 1 wherein the switching valve has a first input that receives the first compressed gas mixture and a second input that receives the second compressed gas mixture.

3. The tire inflation system of claim 1 wherein the switching valve provides the first compressed gas mixture to the tire maintenance system when a pressure of the first compressed gas mixture is greater than a first gas mixture threshold pressure value.

4. The tire inflation system of claim 1 further comprising a nitrogen generation module that receives the first compressed gas mixture and outputs the second compressed gas mixture.

5. The tire inflation system of claim 1 wherein the first compressed gas mixture is dry air.

6. The tire inflation system of claim 1 wherein the first gas supply is fluidly coupled to the second gas supply.

7. The tire inflation system of claim 6 further comprising a nitrogen generation module that receives compressed air from the first gas supply and outputs the second compressed gas mixture to the second gas supply.

8. A tire inflation system for a vehicle comprising:
- a pressurized gas supply system that is disposed on the vehicle and includes:
  - a first compressed gas supply that provides compressed air;
  - a nitrogen generation module that receives compressed air from the first compressed gas supply and outputs a second compressed gas mixture having a greater concentration of nitrogen than that of the compressed air; and
  - a switching valve having a first input that receives compressed air from the first compressed gas supply and a second input that receives the second compressed gas mixture;
- wherein the switching valve outputs compressed air when in a first position and outputs the second compressed gas mixture when in a second position.

9. The tire inflation system of claim 8 further comprising a filter disposed between the first compressed gas supply and the nitrogen generation module for filtering compressed air provided to the nitrogen generation module.

10. The tire inflation system of claim 8 further comprising a first valve disposed between the first compressed gas supply and the nitrogen generation module, wherein the first valve is closed when a vehicle engine is not running.

11. The tire inflation system of claim 8 further comprising a tank that receives the second compressed gas mixture from the nitrogen generation module.

12. The tire inflation system of claim 11 further comprising a flow restrictor disposed between the nitrogen generation module and the tank that controls a gas flow rate through the nitrogen generation module to improve operating efficiency of the nitrogen generation module.

13. The tire inflation system of claim 12 further comprising a first check valve disposed between the flow restrictor and the tank that inhibits the second compressed gas mixture from flowing from the tank to the nitrogen generation module.

14. The tire inflation system of claim 8 further comprising a tire maintenance system disposed on the vehicle that fluidly couples the switching valve to a vehicle tire, wherein the switching valve provides the second compressed gas mixture to the tire maintenance system to inflate the vehicle tire when a low tire pressure is detected and a pressure of the second compressed gas mixture is greater than a threshold pressure value.

15. The tire inflation system of claim 14 further comprising a second check valve disposed between the switching valve and the tire maintenance system that inhibits gas from flowing from the tire maintenance system to the switching valve.

16. A method of controlling a tire inflation system for a vehicle comprising:
- providing a pressurized gas supply system having a first gas supply configured to provide a first compressed gas mixture and a second gas supply configured to provide a second compressed gas mixture having a greater concentration of nitrogen than the first compressed gas mixture;
- determining whether inflation of a tire is desired;
- providing the second compressed gas mixture to inflate the tire when inflation of the tire is desired and a pressure of the second compressed gas mixture exceeds a second gas mixture threshold pressure value; and
- providing the first compressed gas mixture to inflate the tire when inflation of the tire is desired, pressure of the second compressed gas mixture does not exceed the second gas mixture threshold pressure value, and a pressure of the first compressed gas mixture exceeds a first gas mixture threshold pressure value.

17. The method of claim 16 wherein the first compressed gas mixture is air.

18. The method of claim 16 wherein the first compressed gas mixture is not provided to inflate the tire when pressure of the first compressed gas mixture does not exceed the first gas mixture threshold pressure value.

19. The method of claim 16 further comprising closing a first valve disposed between the first gas supply and the second gas supply when the vehicle is off to inhibit flow of compressed air through a nitrogen generation module disposed between the first and second gas supplies.

20. The method of claim 19 further comprising opening the first valve after a vehicle engine has started.

* * * * *